(No Model.)
P. SCHAEFER.
VETERINARY DRENCHING BOTTLE.
No. 521,596. Patented June 19, 1894.
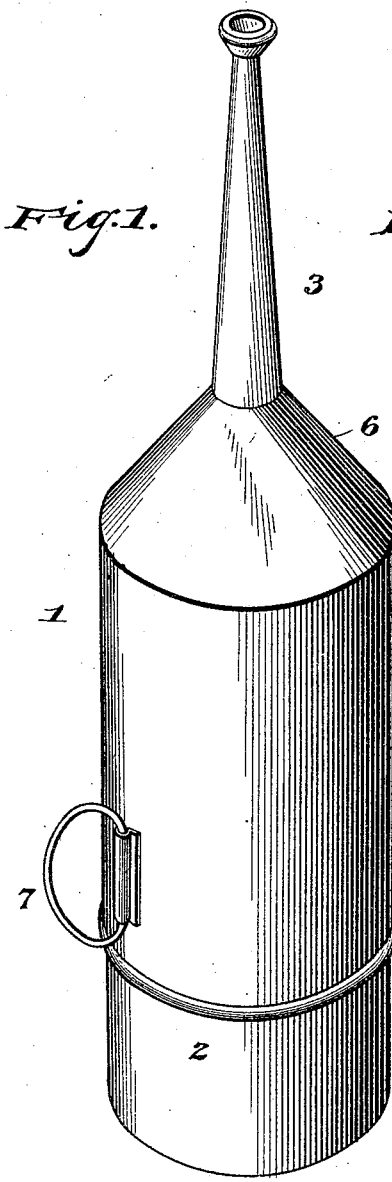
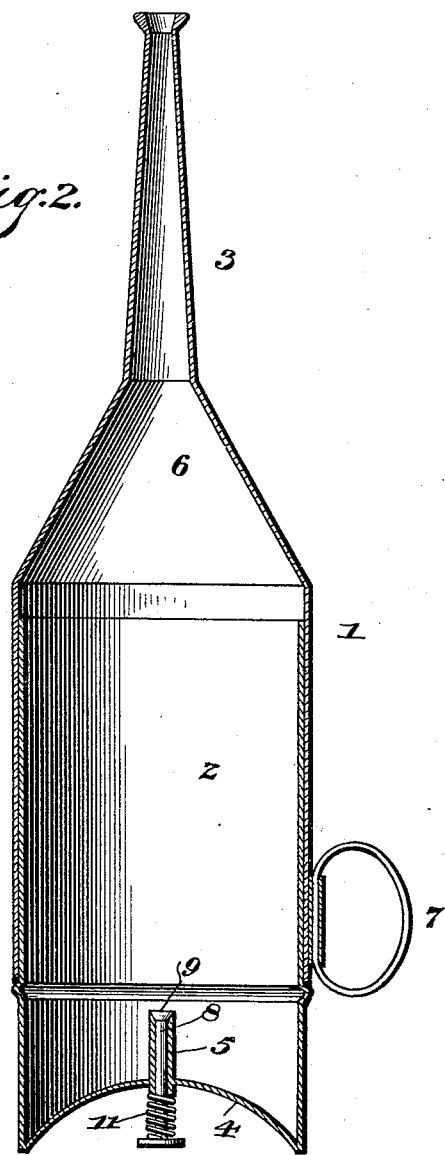

United States Patent Office.

PETER SCHAEFER, OF ST. PETER, MINNESOTA, ASSIGNOR OF ONE-HALF TO GEORGE W. BUNCE, OF SAME PLACE.

VETERINARY DRENCHING-BOTTLE.

SPECIFICATION forming part of Letters Patent No. 521,596, dated June 19, 1894.

Application filed September 28, 1893. Serial No. 486,724. (No model.)

*To all whom it may concern:*

Be it known that I, PETER SCHAEFER, a citizen of the United States, residing at St. Peter, in the county of Nicollet and State of Minnesota, have invented a new and useful Drenching-Bottle, of which the following is a specification.

The invention relates to improvements in drenching bottles.

The object of the present invention is to improve the construction of drenching bottles for administering medicine to animals, and to provide a simple and inexpensive one, from which a liquid will freely flow down the throat of an animal without the inconvenience present with that class of drenching bottles in which the spout or mouth serves as a vent.

A further object of the invention is to provide a drenching bottle, which may be readily supplied with medicine without liability of spilling the same to enable a dose to be accurately administered, and which will permit ready access to its interior for the purpose of cleaning.

The invention consists in the construction and novel combination and arrangement of parts hereinafter fully described, illustrated in the accompanying drawings and pointed out in the claims hereto appended.

In the drawings—Figure 1 is a perspective view of a drenching bottle constructed in accordance with this invention. Fig. 2 is a central vertical sectional view.

Like numerals of reference indicate corresponding parts in both figures of the drawings.

1 and 2 designate two separable and extensible telescoping sections of a drenching bottle for administering medicine to animals; the upper section 1 is provided with a spout or neck 3 adapted to be inserted in the mouth and down the neck of an animal; and the lower section 2 is provided at its bottom 4 with a vent opening 5 to permit the entrance of air when the bottle is inverted for administering a dose to an animal to prevent the liquid, by enabling it to flow freely from forcing air out the neck or spout and carrying the same into the stomach of the animal. The sections 1 and 2 are preferably cylindrical, but may be of other desirable shape and may be constructed of any suitable material. The upper section 1 has a tapering conical upper portion 6 arranged adjacent to the lower end of the spout or neck; and the said section 1 is provided with a ring 7 to serve as a handle to enable the bottle to be conveniently held in an inverted position for use. The bottom 4 of the drenching bottle is concavo-convex to form a recess beneath the bottle to receive a valve stem 8, and to prevent the latter from coming in contact with the supporting surface in order that the bottle may be placed in an upright position when not in use. The outer edge or circumference of the bottom 4 lies below the plane of the lower end of the stem of the valve, and when the bottle is in a vertical position the valve cannot be accidentally opened and the contents of the bottle will not be spilled. The valve stem is provided at its upper end with a valve plug 9 for closing the vent opening. The lower end of the valve stem is provided with a disk; and a spiral spring 11 is interposed between the disk and the bottom 4, and is disposed on the valve stem. When the bottle is inverted for use the vent may be readily opened to permit the liquid to flow freely by depressing the valve stem against the action of the spring; and as soon as the valve stem is released the spring will immediately close the valve.

It will be seen that the drenching bottle is simple and comparatively inexpensive in construction, that it may be readily supplied with medicine and can be readily cleaned, and that a dose may be accurately administered without liability of spilling a portion of it, and without liability of forcing air into the stomach of an animal.

Changes in the form, proportion and the minor details of construction may be resorted to without departing from the principle or sacrificing any of the advantages of this invention.

What I claim is—

1. A drenching bottle comprising two separable telescoping sections and provided with a vent, one of the sections having a spout, substantially as described.

2. A drenching bottle comprising the upper and lower separable telescoping sections, the upper section being provided with a spout and the lower section having an inwardly extending concavo-convex bottom provided with a vent opening, and a spring actuated valve for closing the vent opening, substantially as described.

In testimony that I claim the foregoing as my own I have hereto affixed my signature in the presence of two witnesses.

PETER SCHAEFER.

Witnesses:
C. R. DAVIS,
W. G. SAUMANN.